United States Patent
Griffith et al.

(10) Patent No.: US 11,525,934 B2
(45) Date of Patent: Dec. 13, 2022

(54) METHOD FOR IDENTIFYING SUBSURFACE FLUIDS AND/OR LITHOLOGIES

(71) Applicant: SHELL OIL COMPANY, Houston, TX (US)

(72) Inventors: Donald Paul Griffith, Houston, TX (US); Sam Ahmad Zamanian, Houston, TX (US); Russell David Potter, Houston, TX (US); Stéphane Youri Richard Michael Joachim Gesbert, Amsterdam (NL); Thomas Peter Merrifield, London (GB)

(73) Assignee: SHELL USA, INC., Houston, TX (US)

( * ) Notice: Subject to any disclaimer, the term of this patent is extended or adjusted under 35 U.S.C. 154(b) by 238 days.

(21) Appl. No.: 15/931,737

(22) Filed: May 14, 2020

(65) Prior Publication Data
US 2020/0363546 A1   Nov. 19, 2020

Related U.S. Application Data

(60) Provisional application No. 62/848,898, filed on May 16, 2019.

(51) Int. Cl.
*G01V 1/30* (2006.01)
*G06N 3/08* (2006.01)
*G01V 99/00* (2009.01)

(52) U.S. Cl.
CPC .............. *G01V 1/30* (2013.01); *G06N 3/08* (2013.01); *G01V 99/00* (2013.01); *G06N 3/084* (2013.01)

(58) Field of Classification Search
USPC ......................................................... 702/11
See application file for complete search history.

(56) References Cited

U.S. PATENT DOCUMENTS

| | | | | |
|---|---|---|---|---|
| 6,061,301 A | * | 5/2000 | Corrigan .................. | G01V 1/36 367/51 |
| 2006/0074825 A1 | * | 4/2006 | Mirowski ................ | G01V 1/40 706/20 |
| 2012/0221306 A1 | * | 8/2012 | Hurley .................. | G01V 99/005 703/6 |
| 2015/0278635 A1 | * | 10/2015 | Poggio ................. | G06V 10/454 382/118 |
| 2015/0371429 A1 | * | 12/2015 | Spicer ................... | G06T 15/503 345/420 |
| 2019/0041534 A1 | | 2/2019 | Bandura et al. | |
| 2019/0064389 A1 | | 2/2019 | Denli et al. | |
| 2019/0383965 A1 | * | 12/2019 | Salman .................... | G01V 1/30 |

FOREIGN PATENT DOCUMENTS

WO    2018148492 A1    8/2018

OTHER PUBLICATIONS

Reid et al., "Introduction to Geophysical Modelling and Inversion", Geophysical Inversion for Mineral Explorers, ASEG-WA, Sep. 2014, 53 pages.

* cited by examiner

*Primary Examiner* — Paul D Lee
(74) *Attorney, Agent, or Firm* — Shell USA, Inc.

(57) ABSTRACT

A method for a method for identifying a subsurface pore-filling fluid and/or lithology. A training set of field-acquired geophysical data and/or simulated geophysical data is provided to train a backpropagation-enabled process. The trained process is used on a field-acquired data set that is not part of the training set to infer presence of a subsurface pore-filling fluid and/or lithology.

21 Claims, No Drawings

METHOD FOR IDENTIFYING SUBSURFACE FLUIDS AND/OR LITHOLOGIES

CROSS REFERENCE TO RELATED APPLICATIONS

This application claims priority benefit of U.S. Provisional Application No. 62/848,898 filed May 16, 2019, which is incorporated herein by reference in its entirety.

FIELD OF THE INVENTION

The present invention relates to backpropagation-enabled processes, more specifically, to a method for training a backpropagation-enabled process to infer the presence of subsurface fluids and/or lithologies.

BACKGROUND OF THE INVENTION

Geophysical data are used for hydrocarbon exploration and other geotechnical studies. Field-acquired geophysical data includes, for example, seismic and other remote-sensing data, and well logging data. Interpretation of the data assists in determining the probability of presence of hydrocarbons and other fluids in an area of interest.

Geophysical inversion uses forward modeling for predicting data for a given model and inversion to predict a model for known data. As discussed, for example, in Reid ("Introduction to Geophysical Modelling and Inversion" *Geophysical Inversion for Mineral Explorers* ASEG-WA, September 2014), a starting model and acquisition parameters are used to calculate a model response using a forward modeling algorithm. Observed and model responses are compared to calculate an objective function. If the objective function is large, the model parameters are revised and used in another iteration to calculate a revised model response. This is typically continued until the objective function is small or a maximum number of iterations is exceeded.

US20190064389A1 (Denli et al, 28 Feb. 2019) relates to geophysical inversion with convolutional neural networks (CNNs). The method involves storing geophysical data obtained from a survey of a subsurface region and extracting a subsurface physical property model by processing the geophysical data with one or more CNNs. The CNNs are trained to relate the geophysical data with a subsurface physical property consistent with geophysical prior information.

Denli et al sought to find a solution to computational challenges, lack of convexity in objective functions and non-uniqueness of solutions in traditional geophysical inversion processes. According to Denli et al, artificial neural networks (ANN) have been applied to traditional geophysical inversion processes to address data-processing problems. But ANNs require a large amount of data to train and cannot scale to real-world geophysical problems because the number of internal parameters to be learned exponentially increases with the size of the input and output. Denli et al use deep convolutional networks having a number of convolutional layers (input layers interfacing to geophysical data, output layers interfacing to subsurface models and hidden layers remaining between the input and output layers) to extract a subsurface physical property model.

While Denli et al provide improvements to ANN solutions, which in turn address data-processing challenges of traditional geophysical inversion problems, the solution still relies on forwarding modeling and an objective function that may become trapped. In effect, Denli et al retain the traditional approach and apply CNNs to the traditional approach.

There is a need for a method for identifying subsurface fluids and/or lithologies that improves conventional processes by improving accuracy and efficiency, while reducing the need for computational resources.

SUMMARY OF THE INVENTION

According to one aspect of the present invention, there is provided a method for identifying at least one of a subsurface pore-filling fluid, lithology and combinations thereof, the method comprising the steps of: providing a training set of geophysical data, the geophysical data selected from field-acquired geophysical data, simulated geophysical data and combinations thereof; training a backpropagation-enabled process on the training set; and using the trained process on a field-acquired data set that is not part of the training set to infer presence of at least one of a subsurface pore-filling fluid, lithology and combinations thereof.

DETAILED DESCRIPTION OF THE INVENTION

The present invention provides a method for identifying a subsurface pore-filling fluid and/or a lithology. A training set of geophysical data is used to train a backpropagation-enabled process. The trained process is used on a field-acquired data set that is not part of the training set to infer the presence of a subsurface fluid and/or lithology.

Subsurface pore-filling fluids include, for example, without limitation, gas, oil, brine and/or condensate. Lithologies include, for example, without limitation, sand, shale, limestone, carbonates and/or volcanics.

The training set of geophysical data may be field-acquired and/or simulated geophysical data. The geophysical data may have a dimension in the range of 1 to 6. An example of 1D geophysical data is well-log data. A seismic array is an example of 2D or 3D data, while pre-stack seismic response data may be 4D and/or 5D. An example of 6D data may be 5D data with time-lapse data. Seismic response data may be field-acquired and/or simulated seismic data from multiple field or simulated source locations and/or multiple field or simulated receiver locations. Seismic response data includes, for example, without limitation, single offset, multiple offsets, single azimuth, multiple azimuths, and combinations thereof for all common midpoints of field-acquired and/or simulated seismic data. 4D-6D data may also be 3D seismic data with attributes related to seismic survey acquisition or the result of multiple attribute computations. As an example, multiple attributes preferably comprise 3 color channels. The seismic response data may be measured in a time domain and/or a depth domain.

Examples of backpropagation-enabled processes include, without limitation, artificial intelligence, machine learning, and deep learning. It will be understood by those skilled in the art that advances in backpropagation-enabled processes continue rapidly. The method of the present invention is expected to be applicable to those advances even if under a different name. Accordingly, the method of the present invention is applicable to the further advances in backpropagation-enabled processes, even if not expressly named herein.

A preferred embodiment of a backpropagation-enabled process is a deep learning process, including, but not limited to a convolutional neural network.

The backpropagation-enabled process may be supervised, semi-supervised, unsupervised or a combination thereof. In one embodiment, a supervised process is made semi-supervised by the addition of an unsupervised technique. In another embodiment, a subset of the geophysical data is labeled in a semi-supervised process. As an example, the unsupervised technique may be an auto-encoder step. Examples of an unsupervised backpropagation-enabled process include, without limitation, a variational autoencoder (VAE) process and a generative adversarial network (GAN) process. Examples of a semi-supervised backpropagation-enabled process include, without limitation, a semi-supervised VAE process and a semi-supervised GAN process.

In a supervised backpropagation-enabled process, the training set of geophysical data is labeled to provide examples of fluids and lithologies of interest. Using a trained unsupervised backpropagation-enabled process, a fluid and/or lithology of interest may be identified by, for example, drawing a polygon around the image of interest in the geophysical data. The trained process will then identify areas of interest having similar latent space characteristics. When the training set is labeled geophysical data, the labels may have a dimension of 1D-3D.

In one embodiment, the supervised backpropagation-enabled process is a classification process. The classification process may be conducted voxel-wise, slice-wise and/or volume-wise.

In another embodiment, the unsupervised backpropagation-enabled process is a clustering process. The clustering process may be conducted voxel-wise, slice-wise and/or volume-wise.

In another embodiment, the unsupervised backpropagation-enabled process is a generative process. The generative process may be conducted voxel-wise, slice-wise and/or volume-wise.

Probability of inference may be different voxel by voxel, slice by slice and/or volume by volume.

Preferably, the backpropagation-enabled process is a segmentation process.

In a preferred embodiment, the training step includes validation and testing.

The trained backpropagation-enabled process is used on a field-acquired data set that is not part of the training set to infer the presence of a subsurface pore-filling fluid and/or a lithology. Preferably, the inference has a dimension in the range of 1D-3D. Labels for the inferred output will have the same dimension of the labeled geophysical data. In accordance with the present invention, the inference is consistent with geological prior information.

While preferred embodiments of the present invention have been described, it should be understood that various changes, adaptations and modifications can be made therein within the scope of the invention(s) as claimed below.

What is claimed is:

1. A method for identifying at least one of a subsurface pore-filling fluid, lithology and combinations thereof, the method comprising the steps of:
   providing a training set of geophysical data, the geophysical data selected from field-acquired geophysical data, simulated geophysical data and combinations thereof;
   training a backpropagation-enabled process on the training set to identify, during training, the presence of at least one of a subsurface pore-filling fluid, lithology, and combinations thereof; and
   using the trained process on a field-acquired data set that is not part of the training set to infer presence of at least one of a subsurface pore-filling fluid, lithology and combinations thereof.

2. The method of claim 1, wherein the backpropagation-enabled process is a deep learning process.

3. The method of claim 1, wherein the backpropagation-enabled process is a supervised process and the training set of geophysical data is labeled.

4. The method of claim 3, wherein a label for the labeled geophysical data has the same dimension as the dimension of the at least one of the subsurface pore-filling fluid, lithology and combinations thereof for which the presence has been inferred.

5. The method of claim 3, wherein the supervised backpropagation-enabled process is a classification process that is conducted voxel-wise, slice-wise or volume-wise.

6. The method of claim 1, wherein the backpropagation-enabled process is an unsupervised process.

7. The method of claim 6, wherein the unsupervised backpropagation-enabled process is selected from the group consisting of a variational autoencoder process, a generative adversarial network process, and combinations thereof.

8. The method of claim 6, wherein the unsupervised backpropagation-enabled process is a clustering process that is conducted voxel-wise, slice-wise or volume-wise.

9. The method of claim 1, wherein the backpropagation-enabled process is a semi-supervised process and a subset of the training set of geophysical data is labeled for the presence of the at least one of a subsurface pore-filling fluid, lithology, and combinations thereof.

10. The method of claim 9, wherein the semi-supervised backpropagation-enabled process is a semi-supervised variational autoencoder process, a semi-supervised generative adversarial network process, and combinations thereof.

11. The method of claim 1, wherein the training step further comprises validating and testing.

12. The method of claim 1, wherein the field-acquired geophysical data and the simulated geophysical data comprise seismic response data.

13. The method of claim 12, wherein the seismic response data is selected from data comprised of single offset, multiple offsets, single azimuth, multiple azimuths, and combinations thereof for all common midpoints of field-acquired seismic data, simulated seismic data and combinations thereof.

14. The method of claim 13, wherein the geophysical data are measured in a time domain.

15. The method of claim 13, wherein the geophysical data are measured in a depth domain.

16. The method of claim 1, wherein the pore-filling fluid is selected from the group consisting of gas, oil, brine, condensate, and combinations thereof.

17. The method of claim 1, wherein the geophysical data has a dimension in the range of from 1 to 6.

18. The method of claim 1, wherein the lithology is selected from the group consisting of sand, shale, limestone, carbonates, volcanics and combinations thereof.

19. The method of claim 1, wherein the backpropagation-enabled process is a segmentation process.

20. The method of claim 1, wherein the multi-dimensional seismic data set comprises multiple attributes.

21. The method of claim 20, wherein the multiple attributes comprise 3 color channels.

* * * * *